Feb. 20, 1934.    G. P. URBAN    1,948,228
PROCESS OF DESTROYING INSECTS
Filed March 10, 1933    2 Sheets-Sheet 1

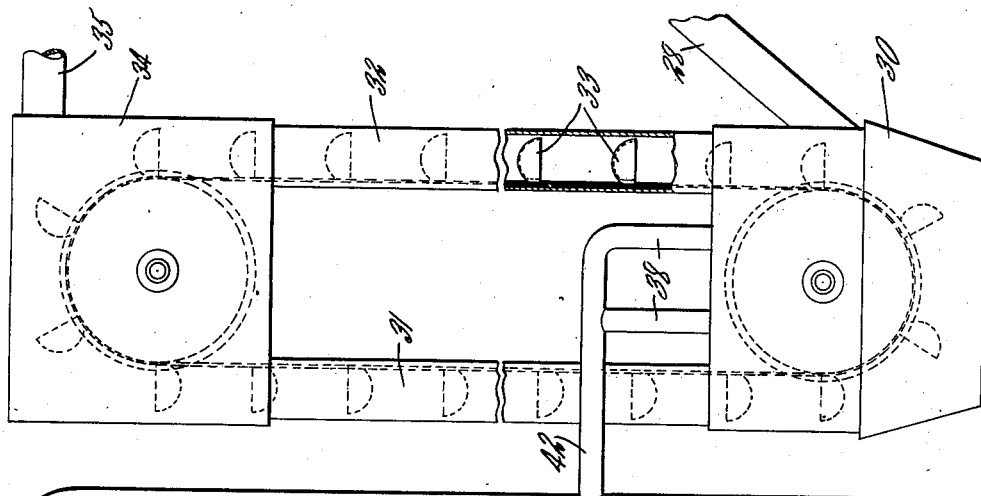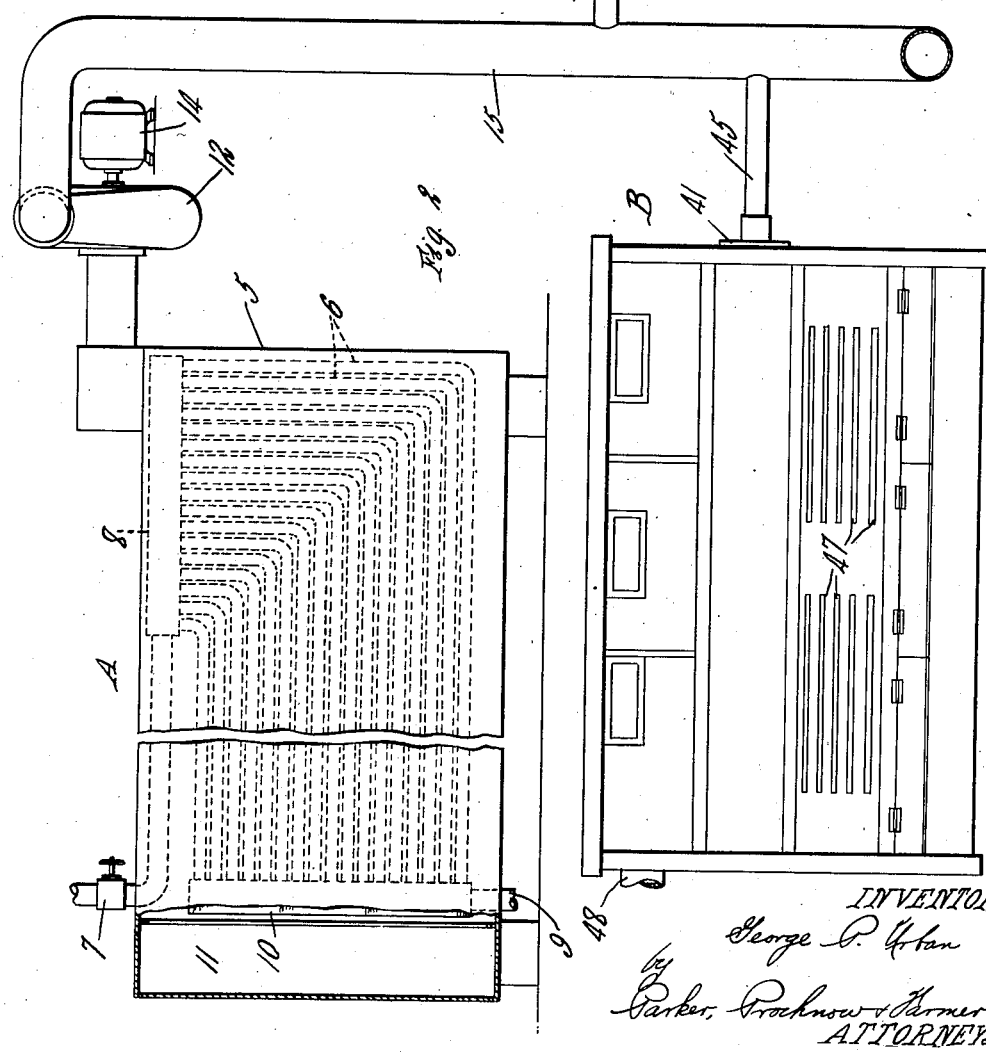

Patented Feb. 20, 1934

1,948,228

UNITED STATES PATENT OFFICE 1,948,228

PROCESS OF DESTROYING INSECTS

George P. Urban, Buffalo, N. Y.

Application March 10, 1933. Serial No. 660,262

7 Claims. (Cl. 43—124)

This invention relates to improvements in processes for destroying insects of the kind which infest machinery or appliances used in connection with the manufacture of grain products.

Flour mills and other plants engaged in the manufacture of grain products are usually troubled with insects, such for example as the Mediterranean moth, which lives mainly on grain after it has been crushed or ground. While flour milling machinery is in operation, the moth is not particularly troublesome. When, however, the mill is shut down even for a period of a few days, this pest develops very rapidly in the various appliances. Fumigation of mills is now being used to combat the pest and cyanide gas is probably the most effective. This type of fumigation, however, is expensive and dangerous and the mill must be entirely closed during the period of fumigation. Within a few weeks after fumigation, the insects again appear.

I have found that since these insects propagate mainly in certain machines or apparatus in which grain is treated after crushing, ordinary sterilizing methods as heretofore used do not appear to penetrate sufficiently into all of the cracks, crevices and recesses in such machines and appliances to kill all of the insects which may be found therein.

The objects of this invention are to provide a process of destroying insects by means of which a heated inert gas is introduced directly into appliances of the kind in which these insects most readily develop for a period of time long enough to destroy these insects in all stages of life; also to provide a process of this kind by which the destruction of the insects is confined to appliances in which they most readily develop, by means which are non-toxic so that it is not necessary to shut up the building or mill in which the appliances are located; also to provide a process of this kind by means of which one or a number of selected machines may be processed without interfering with the operation of the other machines, or with the use of the building in which the appliances are located; also to improve processes of this kind in other respects hereinafter specified.

In accordance with my process, I heat any substantially inert gas, preferably air, to a temperature sufficiently high to destroy insects in all stages of life, and then direct this heated air or gas into the appliances in which these insects most readily develop. I continue to direct heated air or gas into the appliances for a period of time sufficient to completely destroy these insects in all stages of life and in all parts of the appliances. In the case of appliances of the kind which have openings leading into the room in which they are located, I either close these openings entirely or partially to stop or restrict the flow of hot air or gas out of the appliances, and if desired a restricted flow of hot air out of these appliances at certain portions may be employed to insure the hot gas getting into all parts of the appliances. In most factories and mill buildings, it is, of course, necessary to restrict this flow of hot air out of these appliances to such an extent that the rooms in which the appliances are located will not be raised to temperatures at which the sprinkler systems will discharge water or at which other damage may result to the building.

In most appliances of this kind, such for example as middlings separators, screening machines, and the like, each machine is provided with an air duct having a suction or blower therein which withdraws dust from the machine to a sufficient extent at least to prevent the escape of dust into the room. I also found it very desirable to continue the flow of hot air or gas into these ducts, since any dust adhering to the walls of such ducts, favors the development of insects therein. By using ducts of this kind, I am also assured of a continuous circulation of hot air or gas through the appliances, so that as air is cooled by contact with portions of the appliances, it is continuously replaced by hot air. In the case of elevators or other appliances which do not have vent ducts, a duct or air passage of this kind may be added, if desired, to insure circulation of the hot air to all parts of the elevators or similar appliances. Consequently, all interior parts of such appliances eventually become heated to the temperature of the incoming hot air.

Referring to the drawings in which my process is illustrated diagrammatically:

Fig. 2 is an elevation, partly in section, on a larger scale showing the means for heating air or gas and for discharging the same into appliances of different types used in flour mills or similar establishments.

Figure 1:
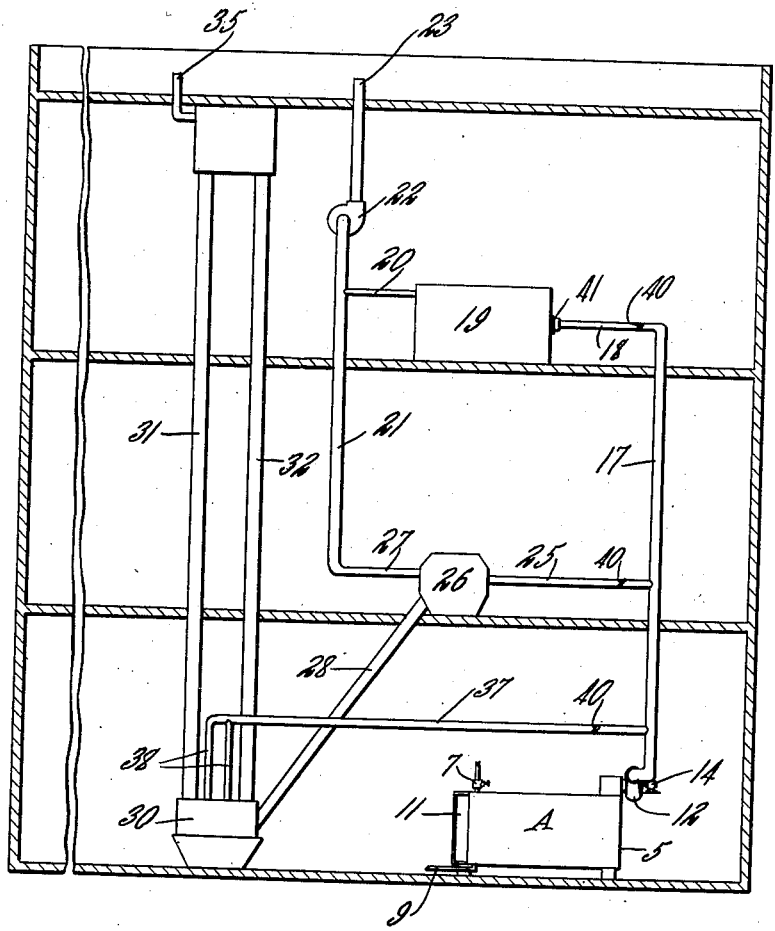
Fig. 1 is a sectional elevation of a mill or building containing machines, apparatus, or other appliances used in connection with the manufacture of grain products and showing how my process may be applied to such appliances.

A, Figs. 1 and 2, represents a heater for air or other gas and which may have a suitable housing or shell 5 containing a series of pipes or coils of pipes 6, shown in broken lines in Fig. 2, to which steam or other heating medium may be admitted, for example, through an inlet pipe controlled by a valve 7 and leading to a header 8. The water condensed in the pipes may be discharged through my outlet pipe or duct 9 connected with a header 10. The air or gas may enter into a passage 11 at one end of the heater and may be discharged from the other end thereof by means of a blower or fan 12 driven by any suitable source of power, such for example as an electric motor 14. The heated air is discharged by the fan or blower into a downwardly extending duct or passage 15 in the arrangement shown in Fig. 2 and into an upwardly extending duct 17 in the arrangement shown in Fig. 1. Each duct is arranged to be connected with any appliance to be treated, branch pipes being preferably provided for this purpose. It will, of course, be obvious that any other suitable or desired means for heating air and transmitting the same to the appliances to be treated, may be employed.

In the particular arrangement illustrated in Fig. 1, the pipe or duct 17 has a branch pipe 18 leading to an appliance 19. This appliance, in the construction shown, is provided with a vent passage or duct 20 leading to a main vent pipe or duct 21 through which air is drawn by means of a fan or blower 22, and from which air may be discharged to suitable separators (not shown) through a duct 23 leading out of the building. The main hot air pipe 17 is also provided with a branch pipe 25 leading to another type of appliance 26 also connected to the vent duct 21 by means of a branch pipe 27. The appliance 26 is shown as having a discharge chute 28 connecting with a lower part 30 of an elevator. This elevator has two upright tubular passages or ducts 31 and 32 containing the usual chain or belt and buckets 33, Fig. 2. The upper end of the elevator 34 may, if desired, be provided with a vent pipe or duct 35. Hot air may be admitted to the elevator by means of a branch pipe 37 connecting with the main hot air pipe 17 and discharging into the lower part 30 of the elevator, for example, by means of a pair of pipes or ducts 38. Obviously any number of appliances may similarly be connected with the air heater A and preferably the various branch pipes are provided with suitable dampers or valves 40 of any suitable construction, which can be opened or closed to control the flow of heated air to any appliance in which it is to be used. In place of the dampers 40, it is, of course, possible also to make the branch pipe connections with the appliances detachable as, for example, is illustrated by means of a detachable connection 41 with the appliance 19 in Fig. 1, and when the branch pipe 18 is disconnected from the appliance 19, the end of the branch pipe may be closed by means of a cap or any other closing device.

In Fig. 2, the main hot air pipe 15 is shown connected to an elevator similar to the one shown in Fig. 1, a branch pipe 42 connecting with the pipe 15 and with the pair of pipes or ducts 38. Fig. 2 also shows a middlings purifier or separator B to which a branch pipe 45 connects. The frame or housing of this appliance is provided with a plurality of air openings or slits 47 through which air may enter from the room in which the appliance is located when the interior of the appliance is subjected to suction through the duct 48. When the hot air is admitted to the interior of this appliance, these air openings can be closed by any suitable means (not shown), such for example as pads or plates of the desired shape and size to cover to the desired extent the portion of the housing of this appliance containing the slits 47. If desired, in order to insure a flow of hot air to all parts of the appliance, these openings may be left open or may be only partly closed by such cover plates.

In the carrying out of my process, steam or other heating medium is admitted to the heater A, for example, by opening the valve 7, and the motor 14 is started causing the blower to draw air through the heater and discharge the same into the pipe 15 or 17 and any pipes connecting therewith. Hot air may be discharged into one or more appliances, either by opening valves 40 in branch pipes or by removing the caps or closures on the ends of such pipes and connecting them with the appliances. Air openings in the appliances may be closed to any desired extent as has been described. The hot air will then quickly fill the interior of each appliance connected with the heater and the air after passing through the appliance will discharge out of the same through any of the vent ducts 20, 27, 35 and 48, or into the duct 28. In the case of the elevator shown, there is sufficient clearance between the upright passages 31 and 32 of the elevator and the buckets 33 therein to permit the hot air to pass from one to another portion of the elevator. The air is initially heated to a temperature which preferably is considerably above that necessary to destroy the insects in all stages of life, so that considerable cooling of the air can take place in the appliances before the same becomes lowered to a temperature which no longer kills the insects. In many mills, machines and appliances have wooden frames or housings, which are useful in connection with this process, in that they retard the conductance of heat out of the appliances through the walls thereof, so that the heat of the air entering the appliances is not readily dissipated through the walls thereof, thus effecting a saving in the quantity of heat necessary to sterilize the machines.

The temperatures to which the air is heated may vary considerably. It has been found that temperatures as low as 125 degrees F. are fatal to insects of this kind. I have found, however, that in connection with my process slightly higher temperatures are necessary to insure a thorough sterilization of the appliances, for the reason that the air passing through the appliances is, of course, cooled by contact with the parts thereof and furthermore, any insects located in crevices, cracks, corners, or other recesses in the appliances are not effectively killed, unless the air entering into the appliances is heated to a temperature of at least 130 degrees. The temperature may, of course, be raised to any desired degree, but if heated to excess, the appliances treated may be damaged, or flour or other grain products remaining in such appliances may become scorched, and thus detract from the ultimate product when finally mixed with flour or other products passed through the machines after sterilization. I have found, however, that the air may be safely heated up to approximately 200 degrees F. without detrimental effects upon such parts as screens, textile material, wooden frames or walls, or other parts of these appliances. In using air at temperatures of approximately 200 degrees F., care must, of course, be taken that too much of this air is not allowed to escape into the room, since otherwise automatic sprinkler systems may begin to operate and damage may result to electric wiring or machinery located in the room.

The length of time during which appliances of this kind are treated depends, of course, very largely upon the temperatures employed and upon the nature of the appliances. By using high temperatures on appliances of such construction that all parts thereof can be quickly heated, all forms of life may be destroyed in less than two hours, whereas with other types of appliances, it is advisable to continue the treatment for a full two-hour period, and when using temperatures in the neighborhood of 130 degrees F., the treatment may have to be prolonged for three hours or more to insure the heating of all interior parts of the appliances to the temperature necessary to destroy the insects.

My improved process has the advantages that it can be applied to the interior of various appliances used in flour mills or establishments for the manufacture of grain products at a relatively low cost and without making it necessary to shut off the rooms or the entire building in which the appliances are located. With the aid of my process, I can reach the principal breeding places of the insects directly, whereas any process in which an insect killing medium is applied to the room or building containing the appliances, it is never certain that such medium will reach all crevices and recesses in the interior of the appliances. Furthermore, by using air or other inert gas, no residue condensate or deposit is left in any of the appliances under treatment, which might later on contaminate, change the taste or otherwise damage the product passing through such appliances. Actual use of the process has shown that appliances subjected to the process may be shut down for long periods of time after treatment without growth or development of the insects within such appliances.

The process is inexpensive to carry out for the reason that a relatively small heater may be used capable of operating only on a few appliances at a time, since the period of treatment is relatively short, so that even with a small heater a considerable number of appliances can be treated during the course of a day. The process is particularly desirable for the reason that the heat destroys eggs, as well as the moths or grubs, whereas some forms of fumigants do not destroy the eggs of the insects. It will, of course, be understood that during treatment of appliances having suction ducts, blowers or suction fans, such as the one shown at 22 in Fig. 1, will be stopped while heated air is admitted to the appliances connected therewith, since the blower 12 is sufficient to discharge the hot air through the appliances and ducts. The process is carried on while the machines and appliances are substantially empty of grain products, only such residues of grain products remaining as adhere to the surfaces of the appliances and which are not removed after running the appliances for a short time without feeding in grain or grain products.

I claim as my invention:

1. A process of destroying insects which infest appliances for making grain products, which includes heating exterior to said apparatus a non-poisonous gas to a temperature of at least 130° F. to destroy the insects, passing a substantially continuous current of said heated gas into the interior of an appliance while the same is not operating on grain products and substantially empty of such products, and having the gas held by said appliance to secure a higher pressure within the appliance than that of the exterior atmosphere, and discharging such gas from said appliance at a point remote from the point at which it is introduced, to insure a circulation of said gas through said appliance to destroy insect life in such appliance.

2. A process of destroying insects which infest appliances of the confined type used in making grain products and which appliances include fixed housings in which the movable parts of the appliances are contained, said process including introducing directly into the interior of an appliance when the same is not operating on grain products and contains substantially none of such products a current of air raised to a temperature of at least 130 degrees F., restricting the escape of heated air from the appliance into the room containing the same, and providing an exit for the heated air from said appliance at a distance from the inlet, to provide for a circulation of heated air to all parts of the appliance.

3. A process of destroying insects which infest appliances of the confined type used in making grain products and which appliances include fixed housings in which the movable parts of the appliances are contained and having ducts connected therewith, said process including heating a current of air to a temperature of at least one hundred thirty degrees F., introducing said air current into an appliance for a period of time sufficient to destroy insects in all parts of the appliance and while such appliance and ducts are substantially empty of grain products, discharging air from the appliance through said ducts connected therewith, and restricting the escape of air from other parts of the appliance.

4. A process of destroying insects which infest appliances used in making grain products and the suction ducts connected therewith, and which appliances include fixed housings in which movable parts of the appliances are confined, said process including supplying air heated at temperatures of at least one hundred thirty degrees F. to portions of said appliances at a distance remote from said suction ports, and circulating the heated air into all portions of the interiors of such appliances while the same are idle and substantially empty of grain products, and discharging air from said appliances into said suction ducts while the same are not subjected to suction, to raise the temperature in the interior of said appliances and ducts to a point sufficient to kill any insects therein.

5. A process of ridding flour mill machinery of the type having fixed housings and ducts connected therewith of Mediterranean moths, which includes heating air exterior to said machinery to temperatures of at least 130 degrees F., continuously passing a current of said heated air into the interior of such machinery while such machinery is substantially empty of grain products, discharging air from such machinery through suction ducts connected therewith and continuing the passage of air through said machinery and ducts for a period sufficient to heat all interior portions of such machinery and ducts to temperatures high enough to kill Mediterranean moths in all stages of life.

6. A process of destroying insects infesting flour mill machinery of the type having a portion which forms an enclosure therefor and containing the movable parts of said machinery, and ducts connected therewith, which includes continuously passing a current of air heated from 130 degrees F. to 200 degrees F. into the interior of such machinery for a period of at least two hours while such machinery is substantially empty of grain products, continuously discharging air from said machinery through a duct to destroy the insects in said duct, and restricting the discharge of hot air out of said machinery into the room in which it is located.

7. A process of destroying insects which infest appliances used in making grain products, which appliances have fixed housings, said process including heating exterior to said apparatus a non-poisonous gas to a temperature of at least 130 degrees F., directing said heated gas into the interior of an appliance of this kind while such appliance is substantially empty of grain products, restricting the discharge of hot gas from said appliance into the room in which it is located, to produce within the appliance a pressure slightly greater than that of the air surrounding said appliance, and continuing the directing of air into said appliance until all portions of said appliance attain a temperature sufficient to destroy the insects.

GEO. P. URBAN.